United States Patent Office 3,504,582
Patented Apr. 7, 1970

3,504,582
TOOL CARRIER FOR MACHINE TOOLS
Gerhard Klee, Frankfurt am Main, and Norbert Jeschke, Urberach, Germany, assignors to Samson Apparatebau AG., Frankfurt am Main, Germany
Filed Apr. 7, 1967, Ser. No. 629,208
Claims priority, application Germany, Apr. 13, 1966, S 103,157
Int. Cl. B23b 21/00
U.S. Cl. 82—24
10 Claims

ABSTRACT OF THE DISCLOSURE

The present invention concerns a tool carrier for machine tools with a base plate connected to a carriage or the like and a tool holder, in which the tool holder together with the tool is selectively adjustable by fluid operable means relative to the base plate when the latter is at a standstill, by minute strokes, for instance, within the range of 1 millimeter.

The present invention relates to a tool carrier for machine tools with a base plate connected to a carriage or the like and a tool holder by means of which minute adjusting strokes for the tool can be realized.

It is known to effect fine adjustments of a machining tool by adjusting the tool carriage. This is effected either mechanically by spindles or the like or in conformity with special methods according to which electric or pneumatic adjusting systems adjust the tool carriage. These adjusting systems, however, cannot at will be connected to any random machine tool, inasmuch as, in each instance, special structural provisions have to be made on the machine tool.

It is, therefore, an object of the present invention to provide a tool carrier which will overcome the above mentioned drawback.

It is another object of this invention to change heretofore known adjusting systems of the above mentioned type by providing a fine adjustment for the tool carrier rather than of the tool carriage.

These and other objects and advantages of the invention will appear more clearly from the following specification, in connection with the accompanying drawings, in which:

FIGURE 1 diagrammatically illustrates a longitudinal section through a tool carrier according to the present invention.

Figure 1:
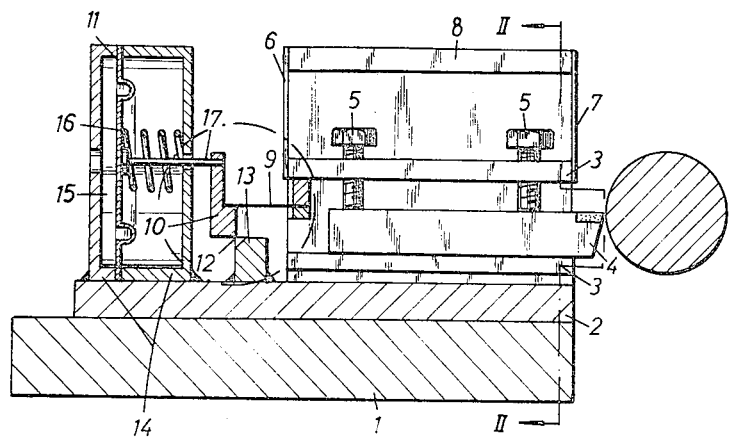

The tool carrier according to the present invention for machine tools with a base plate fixedly connected to a carriage and with a tool holder, is characterized primarily in that the tool holder with the tool is adjustable hydraulically or pneumatically by finest adjusting strokes relative to the base plate which does not change its position.

According to a practical embodiment of the invention, the tool holder is advantageously axially moveably suspended on a holding frame by means of spring bands. In addition thereto, the tool holder is adjustable by an adjusting diaphragm. By means of an additional diaphragm, the tool holder is adapted to be clamped in a direction transverse to its longitudinal direction against a support or the like.

According to a further practical embodiment of the present invention, the tool holder may be clamped into two clamping devices which are operable independent of each other and may be adjustable from the end through one or more serially arranged diaphragms.

A tool holder according to the present invention may be mounted upon the prevailing carriages of a machine tool without requiring any structural changes on the machine tool. The tool carrier according to the invention is adapted to be clamped fast in any position, for instance, by means of a pneumatically or hydraulically operable diaphragm or by pure mechanical means. The purpose of this clamping device consists in permitting the use of the tool carrier provided for the removal of finest chips to carry out a fine machining, also for the removal of coarser chips. The driving system for the tool carrier has a certain rigidity. The reaction force occurring on the tool during a machining operation will press the tool, for instance, the turning steel, in the direction of the axis of movement of the tool holder away from the workpiece by a certain distance, the length of which corresponds to the rigidity of the system and the magnitude of the reaction force. The rigidity of the system is so selected that this pressing away stroke during the removal of small chips and consequently with small reaction forces is within the machining tolerances. With coarser chips, and thus with higher reaction forces, the pressing away stroke may be tool high. For such instances, the tool holder can be clamped fast by means of a clamping device whereby the reaction force is absorbed, not by the driving system of the tool carrier but through the base plate directly by the tool carriage. The removal of coarser chips requires, of course, that the feeding of the steel is effected outside the workpiece. When machining a cylinder on a lathe, this may be effected, for instance, by moving the tool carrier out of the machining zone ahead of the end face of the workpiece where the feeding can be effected by means of a diaphragm driving system or the like. In this way it is possible to feed the workpiece while bypassing the driving system, for instance, through the spindle of the tool carriage.

It is advantageous to provide the tool carrier with two clamping stations adapted to be actuated independently of each other, for stepwise adjustment of the tool carrier. If desired, the tool carrier may for bridging large distances, be adjusted by a pneumatic or hydraulic driving system while the tool is under no load, for effecting a coarse or fast adjustment. As drive in this connection, one or more serially arranged diaphragms or pistons may be provided.

In order to design the diaphragms as simple as possible, they may be provided with grooves or the like to produce a spring effect. The tool holder may be journalled by means of a spring joint, a bolt joint, or a sliding rail.

Figure 2:
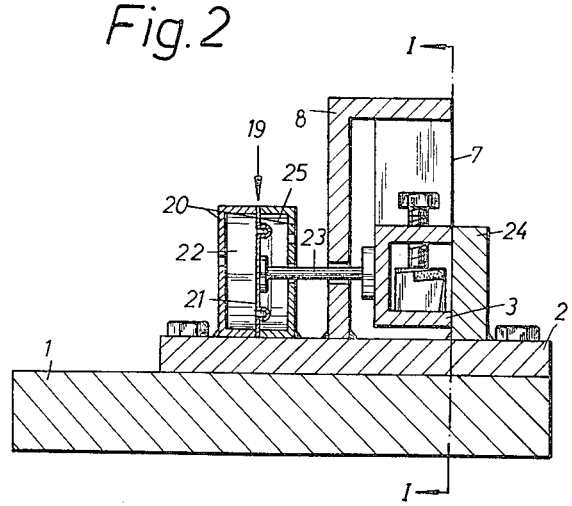
FIGURE 2 is a section along the line II—II of FIG. 1.

Referring now to the drawings in detail, and FIGS. 1 and 2 thereof in particular, the arrangement shown therein comprises a machine tool with a tool carriage 1 to which is fastened a base plate 2 having mounted thereon a tool carrier. This tool carrier comprises a tool holder 3, for instance, a steel holder, of a U-shaped design (FIG. 2). A tool 4, for instance, a turning tool, is by means of screws 5 connected to the tool holder 3. The tool holder 3 is by means of two spring bands 6, 7 suspended on a holding frame 8 (FIG. 2) which frame is welded onto the base plate 2. The journalling of the tool holder 3 by the two spring bands or spring leaves 6, 7 will with small movements of the tool holder 3 in the direction of the longitudinal axis of the tool bring about a frictionless guide. The main cutting force acting in the tool 4 and the feeding force are absorbed by the spring bands 6, 7. The tool holder 3 is, through the intervention of a coupling member 9, likewise formed by a spring band, and through the intervention of a lever 10, connected to an adjusting diaphragm 11. A cross-spring joint 12 which is connected to the base plate 2 by means of a block 13 serves for journalling the lever 10. This journalling may be also effected by a bolt joint.

The adjusting diaphragm 11 is arranged in a two-piece housing 14 which is connected to the base plate 2. The adjusting diaphragm 11 is adapted to be fluid operable—hydraulically or pneumatically—from a housing chamber 15. The force transmitted by the adjusting diaphragm 11 is converted by means of a very stiff spring 16 into a stroke proportional to the pressure. A transfer member 17 conveys the stroke to the transfer lever 10 so that the tool holder 3 will carry out a movement which is proportional to the pressure prevailing in the housing chamber 15. The rigidity of the system with regard to the axis of movement of the tool holder 3 is very high.

FIG. 2 illustrates an adjusting device 19 which makes it possible to clamp fast the tool holder 3 in any position. The clamping device 19 may be actuated mechanically or, in conformity with FIG. 2, pneumatically or hydraulically. The clamping device 19 comprises a diaphragm 21 arranged in a housing 20 and adapted to be acted upon from either side. By means of a ram 23, the diaphragm 21 presses the tool holder 3 against a support 24 when the diaphragm 21 is pressure actuated from a chamber 22. Housing 20 and support 24 are fixedly connected to base plate 2. When the counter chamber 25 is placed under pressure and chamber 22 is vented, an unclamping of the tool holder 3 will be effected.

Figure 3:
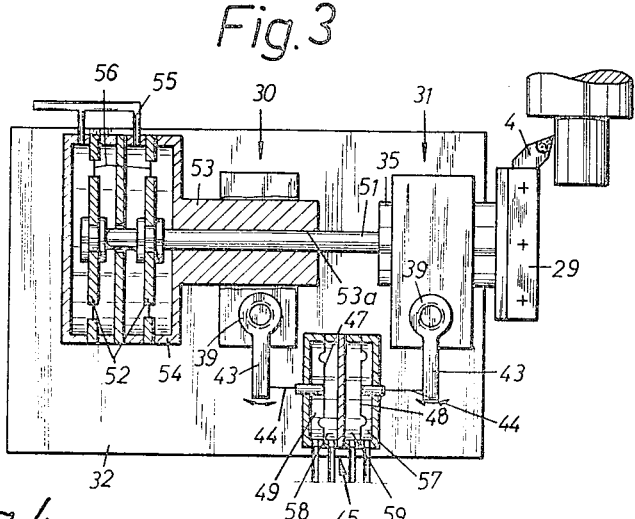
FIGURE 3 illustrates in top view and partly in section, a modified tool carrier with two clamping stations.
Figure 4:
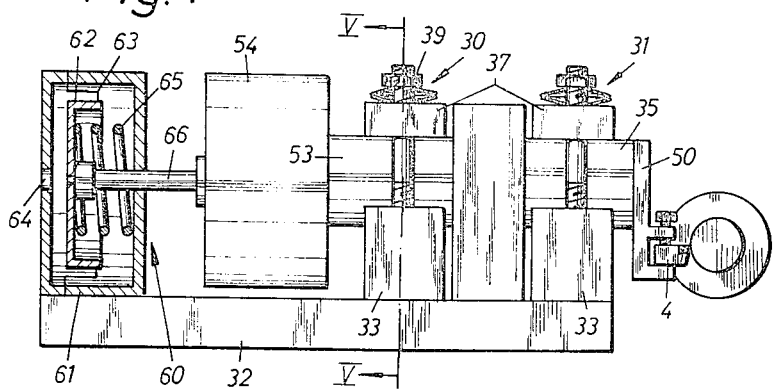
FIGURE 4 is a side view and partial section of the tool carrier shown in FIG. 3.
Figure 5:
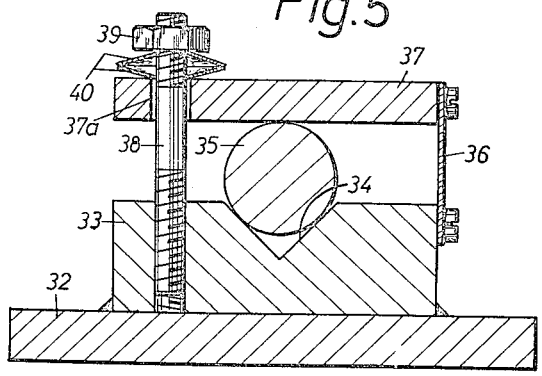
FIGURE 5 is a section taken along the line V—V of FIG. 4, but on a somewhat larger scale than the latter.

With an arrangement according to FIGS. 1 and 2, the tool 4 can be adjusted by relatively small strokes only approximately up to one millimeter. For longer strokes any of the embodiments illustrated in FIGS. 3 to 5 is better suited. With these embodiments, a tool holder 29 has two clamping devices 30, 31 for obtaining a stepwise advance. The clamping devices 30, 31 are fixedly arranged on a base plate 32 which is fastened to a carriage (not illustrated). For each clamping device 30, 31 there is welded to the base plate 32 a receiving member 33 which has a depression 34 for receiving a bolt 35. Depression 34 may preferably be designed prismatically, but may also have any other suitable shape. Through the intervention of a spring band 36, a clamping arm 37 is linked to the receiving member 33. A bolt 38 is connected to the receiving member 33 and extends through a bore 37a in the clamping arm 37 and beyond the latter so that the bolt 35 can be clamped fast by means of a clamping nut 39. Dish springs 40 permit an elastic clamping.

The clamping with the embodiment of FIG. 5 is effected mechanically. However, it may also be effected pneumatically as illustrated in FIG. 3. The clamping nuts 39 are through levers 43 and coupling bars 44 connected to a double diaphragm system 45. When the diaphragms 47, 48 are subjected to pressure prevailing in chambers 49, 59 respectively, the clamping devices 30 and 31 are clamped. When establishing pressure in chambers 58 and 57, the clamping devices 30, 31 are relieved. All diaphragm chambers 49, 57, 58, 59 can be subjected to pressure independently of each other. Bolt 35 (FIG. 3) is on one hand, fixedly connected to the tool holder 29 for the turning tool 4, and on the other hand through a bar 51 is connected to a diaphragm system comprising two diaphragms 52. A stud 53 has a longitudinal bore 53a and is fixedly connected to the diaphragm housing 54. The bar 51 extends through said bore 53a.

The operation of the tool carrier according to FIG. 3 is as follows: First the clamping device 30 is clamped so that the diaphragm housing 54 is stationary with regard to the base plate 32. The clamping device 31 may be assumed to be relieved. If now the diaphragm system comprising two serially arranged diaphragms 52 is subjected to fluid pressure through a conduit 55, the tool carrier 29 will carry out a feeding stroke which is proportional to the pressure. The diaphragms 52 are preferably steel diaphragms which by the provision of grooves 56 are made elastic and act in the manner of springs so that they actually are at one and the same time spring means and diaphragm means. The diaphragms 52 are rather stiff whereby it will be assured that the reaction force which customarily occurs when fine turning, will have no influence, so that the diaphragms 52 for this reason will carry out only very minute strokes.

When the maximum stroke has been effected by the diaphragms 52 and a further feeding of the tool becomes necessary, the clamping device 31 is clamped fast and the clamping device 30 is relieved. When lowering the pressure in conduit 55, the detention of the diaphragm 52 brings about that the diaphragm housing 54 moves toward the right by the stroke. Subsequently, the clamping device 30 can be clamped fast again and the clamping device 31 can be relieved so that the tool holder 29 will again be able to carry out a rightward feeding stroke of the magnitude of the maximum diaphragm stroke.

For bridging larger distances during coarse or fast adjustment of the tool 40 when the latter is under no load, there is provided a pneumatic or hydraulic device according to FIG. 4 with low working ability but with a long stroke. To this end, a driving system 60 is built into the embodiment of FIG. 3. This driving system 60 comprises a housing 61 connected to the base plate 32, a diaphragm carrier 62 fixedly connected through a piston rod 66 to the diaphragm housing 54 of diaphragm 52, and a rolling diaphragm 63 which is adapted to be acted upon by pressure through a bore 64. Furthermore, there is provided a return spring 65, which is built into the housing 61. The coarse adjustment is effected with the clamping devices 30 and 31 relieved, when tool 4 is not in engagement. Instead of the rolling diaphragm 63, also other suitable structural elements, as for instance, pistons may be employed.

It is, of course, to be understood that the present invention is, by no means, limited to the particular embodiments illustrated in the drawings, but also comprises any modifications within the scope of the invention.

What we claim is:

1. A tool holding and adjusting arrangement which includes: a base plate connectable to a tool carriage, frame means connected to said base plate, a tool holder supported by and movable relative to said base plate while the latter is at a standstill, said tool holder being adapted to receive and firmly hold a tool, spring means supported by said frame means and having said tool holder suspended thereon so as to permit movement of said tool holder in the longitudinal direction thereof, and fluid operable adjusting means operatively connected to said tool holder and operable to adjust said tool holder and a tool supported thereby by minute strokes within the range of one millimeter, said fluid operable means including fluid operable diaphragm means.

2. An arrangement according to claim 1, which includes: abutment means arranged on one side of said tool holder, and fluid operable means arranged at the opposite side of said tool holder and operable selectively to press said tool holder against said abutment means to lock said tool holder in its respective position.

3. A tool holding and adjusting arrangement which includes: a base plate connectable to a tool carriage, a tool holder supported by and movable relative to said base plate while the latter is at a standstill, said tool holder being adapted to receive and firmly hold a tool, and a fluid operable adjusting means operatively connected to said tool holder and operable to adjust said tool holder and a tool supported thereby by minute strokes within the range of one millimeter, said fluid operable adjusting means including movable housing means and fluid operable actuating means reciprocable in said housing means, stud means connected to said housing means, connecting rod means slidably extending through said stud means and connecting said fluid operable actuating means to said tool holder, and clamping means respectively associated with said stud means and said connecting rod means and operable selectively to clamp said stud means to hold the same stationary with regard to said rod means or to clamp said connecting rod means to hold the same stationary with regard to said stud means.

4. An arrangement according to claim 3, in which said fluid operable actuating means is formed by diaphragm means operable to adjust said tool holder with regard to that clamipng means which is associated with said stud means.

5. An arrangement according to claim 3, which includes: fluid operable driving means connected to said housing means and operable while said stud means is in its clamped condition to move said housing means and thereby said tool for coarse and fast adjustment of the latter.

6. An arrangement according to claim 5, in which said driving means includes diaphragm means.

7. A tool holding and adjusting arrangement which includes: a base plate fixed to a tool carriage, a tool holder supported by and movable relative to said base plate while the latter is at a standstill, said tool holder being adapted to receive and firmly hold a tool, and fluid operable adjusting means operatively connected to said tool holder and operable to adjust said tool holder and a tool supported thereby by minute strokes, a fluid operable clamping means mounted on said base plate and operable to clamp said tool holder against movement on said base plate, said fluid operable adjusting means being bodily movable to provide coarse adjustment of said tool holder when said clamping means is inoperative, and a second fluid operable clamping means mounted on said base plate and operable to clamp said fluid operable adjusting means on said base plate.

8. An arrangement according to claim 7, in which a fluid operable mechanism controls said fluid operable clamping means so that either of said clamping means may be actuated selectively to clamp or release either or both said tool holder and said fluid operable adjusting means independently or together.

9. An arrangement according to claim 7, in which a fluid operable means is connected to said fluid operable adjusting means to move said adjusting means bodily when said second fluid operable clamping means is inoperative.

10. A tool holding and adjusting arrangement which includes: a base plate fixed to a tool carriage, a tool holder, spring members connecting said tool holder to said base plate, so that said spring members flex to permit movement of said tool holder relative to said base plate and said tool holder is supported by and movable relative to said base plate while the latter is at a standstill, said tool holder being adapted to receive and firmly hold a tool, and fluid operable adjusting means operatively connected to said tool holder and operable to adjust said tool holder and a tool supported thereby by minute strokes, and a fluid operable clamping means mounted on said base plate and operable to clamp said tool holder against movement on said base plate, said tool being longitudinally adjustable in said holder.

References Cited

UNITED STATES PATENTS

| | | | |
|---|---|---|---|
| 1,950,039 | 3/1934 | Smith et al. | 82—25 |
| 2,641,151 | 6/1953 | Lee | 82—21 |
| 2,947,205 | 8/1960 | Wilson | 77—14 |

LEONIDAS VLACHOS, Primary Examiner

U.S. Cl. X.R.

82—21